United States Patent
Hennessy (10) Patent No.: US 10,557,508 B2
(45) Date of Patent: Feb. 11, 2020

(54) MODULAR VISCOUS CLUTCH

(71) Applicant: Horton, Inc., Roseville, MN (US)

(72) Inventor: David R. Hennessy, Burnsville, MN (US)

(73) Assignee: Horton, Inc., Roseville, MN (US)

(*) Notice: Subject to any disclaimer, the term of this patent is extended or adjusted under 35 U.S.C. 154(b) by 0 days.

(21) Appl. No.: 16/335,818

(22) PCT Filed: Sep. 1, 2017

(86) PCT No.: PCT/US2017/049878
§ 371 (c)(1),
(2) Date: Mar. 22, 2019

(87) PCT Pub. No.: WO2018/057276
PCT Pub. Date: Mar. 29, 2018

(65) Prior Publication Data
US 2019/0219108 A1    Jul. 18, 2019

Related U.S. Application Data

(60) Provisional application No. 62/398,831, filed on Sep. 23, 2016.

(51) Int. Cl.
*F16D 35/02* (2006.01)
*F16D 27/14* (2006.01)
(Continued)

(52) U.S. Cl.
CPC .......... *F16D 35/024* (2013.01); *F16D 27/14* (2013.01); *F16D 29/00* (2013.01); *F16D 35/005* (2013.01)

(58) Field of Classification Search
None
See application file for complete search history.

(56) References Cited

U.S. PATENT DOCUMENTS 2,256,345 A    9/1941 Mart
3,215,235 A    11/1965 Kamm
(Continued)

FOREIGN PATENT DOCUMENTS

CN    201190592 Y    2/2009
DE      3148872 A1    6/1983
(Continued)

OTHER PUBLICATIONS

International Search Report and Written Opinion issued in International Application No. PCT/US2017/049878, dated Jun. 26, 2018.
(Continued)

*Primary Examiner* — Mark A Manley
(74) *Attorney, Agent, or Firm* — Westman, Champlin & Koehler, P.A.

(57) ABSTRACT

A viscous clutch includes an input member, an output member, a working chamber defined between the input member and the output member, a reservoir to hold a supply of a shear fluid fluidically connected to the working chamber by a fluid circuit, a valve that is electromagnetically actuatable to selectively control a flow of the shear fluid along the fluid circuit, a control coil assembly, and a securing mechanism. The control coil assembly includes a modular center hub removably attached to the input member, an electromagnetic coil and a coil bearing rotatably supporting the electromagnetic coil on the modular center hub. The securing mechanism is removably attached to the input member radially inward of the working chamber and the reservoir, and includes a radially outwardly extending flange.

20 Claims, 3 Drawing Sheets

(51) Int. Cl.
*F16D 29/00* (2006.01)
*F16D 35/00* (2006.01)

(56) References Cited

U.S. PATENT DOCUMENTS

| | | | |
|---|---|---|---|
| 3,444,748 A | 5/1969 | Sutaruk | |
| 3,498,431 A | 3/1970 | Sutaruk | |
| 3,749,214 A | 7/1973 | Leichliter | |
| 3,752,279 A | 8/1973 | Briar | |
| 3,757,914 A | 9/1973 | Elmer | |
| 4,046,239 A | 9/1977 | Tinholt | |
| 4,246,995 A | 1/1981 | Gee | |
| 4,271,945 A | 6/1981 | Budinski | |
| 4,362,226 A | 12/1982 | Gee | |
| 4,526,257 A | 7/1985 | Mueller | |
| 4,556,138 A | 12/1985 | Martin et al. | |
| 4,692,053 A | 9/1987 | Sampedro | |
| 4,727,969 A | 3/1988 | Hayashi et al. | |
| 4,893,703 A | 1/1990 | Kennedy et al. | |
| 4,987,986 A * | 1/1991 | Kennedy | F16D 35/024 123/41.12 |
| 5,152,383 A | 10/1992 | Boyer et al. | |
| 5,511,643 A | 4/1996 | Brown | |
| 5,560,462 A | 10/1996 | Gustin | |
| 5,893,442 A | 4/1999 | Light | |
| 5,992,594 A | 11/1999 | Herrle et al. | |
| 6,021,747 A | 2/2000 | Gee et al. | |
| 6,056,098 A | 5/2000 | Brown et al. | |
| 6,370,776 B1 | 4/2002 | Kanemitsu et al. | |
| 6,419,064 B1 | 7/2002 | Krammer | |
| 6,443,283 B1 | 9/2002 | Augenstein et al. | |
| 6,481,390 B1 | 11/2002 | Robb | |
| 6,695,113 B2 | 2/2004 | Lutz | |
| 6,935,478 B2 | 8/2005 | Drager et al. | |
| 7,083,032 B2 | 8/2006 | Boyer | |
| 7,191,883 B2 | 3/2007 | Angermaier | |
| 7,278,524 B2 | 10/2007 | Boyer | |
| 7,828,529 B2 | 11/2010 | Baumgartner et al. | |
| 7,854,307 B2 | 12/2010 | Hennessy et al. | |
| 7,913,825 B2 | 3/2011 | Boyer | |
| 7,913,826 B2 | 3/2011 | Boyer | |
| 7,938,240 B2 | 5/2011 | Hennessy et al. | |
| 7,946,400 B2 | 5/2011 | Hennessy et al. | |
| 7,980,373 B2 | 7/2011 | Boyer | |
| 8,100,241 B2 | 1/2012 | Hennessy et al. | |
| 8,186,494 B2 | 5/2012 | Boyer | |
| 8,596,438 B2 | 12/2013 | Boyer | |
| 8,616,357 B2 | 12/2013 | Boyer | |
| 8,881,881 B2 | 11/2014 | Gevers et al. | |
| 8,887,888 B2 | 11/2014 | Hennessy et al. | |
| 9,316,272 B1 | 4/2016 | Gwin | |
| 2002/0014804 A1 | 2/2002 | Nelson et al. | |
| 2005/0029069 A1* | 2/2005 | Angermaier | F16D 35/024 192/58.61 |
| 2007/0205071 A1* | 9/2007 | Light | F16D 35/024 192/58.61 |
| 2012/0279820 A1 | 11/2012 | Hennessy et al. | |
| 2013/0037371 A1 | 2/2013 | Yamada et al. | |
| 2014/0209180 A1 | 7/2014 | Boyer | |
| 2016/0108975 A1 | 4/2016 | Gwin | |
| 2016/0208867 A1 | 7/2016 | Sorg | |
| 2017/0138459 A1 | 5/2017 | Tembreull et al. | |

FOREIGN PATENT DOCUMENTS

| | | |
|---|---|---|
| DE | 4011528 A1 | 10/1991 |
| JP | 2015-218838 A | 12/2015 |
| WO | WO2004051107 A2 | 6/2004 |
| WO | WO2009030574 A1 | 3/2009 |
| WO | WO2011/062856 A2 | 5/2011 |
| WO | WO2014004335 A1 | 1/2014 |
| WO | WO2014047430 A1 | 3/2014 |
| WO | WO2014159374 A1 | 10/2014 |
| WO | WO2016187016 A2 | 11/2016 |
| WO | WO2017062328 A1 | 4/2017 |
| WO | WO2017062330 A1 | 4/2017 |
| WO | WO2014158397 A1 | 10/2017 |
| WO | WO2018004833 A1 | 1/2018 |

OTHER PUBLICATIONS

First Examination Report issued by the Australian Patent Office dated Mar. 1, 2019, in corresponding Australian application No. 2017330214.

* cited by examiner

FIG. 3

MODULAR VISCOUS CLUTCH

CROSS-REFERENCE TO RELATED APPLICATIONS

This Application is a Section 371 National Stage Application of International Application No. PCT/US2017/049878, filed Sep. 1, 2017, and claims priority to U.S. Provisional Application Ser. No. 62/398,831, filed Sep. 23, 2016, the contents of each of which are hereby incorporated by reference in their entireties.

FIELD

The present invention relates to a viscous clutch and associated method.

BACKGROUND

Many processes are designed with an electrical motor providing rotational power as an input source (i.e., prime mover) that delivers torque to an output. Equipment examples of possible outputs would be remote fans, pumps, compressors, conveyors, etc. In many cases, it is not necessary or desirable to drive the output at full speed. An example would be a fan that is sized for a worst-case condition, but at some operating conditions full air flow is not necessary for the process or equipment associated with the fan. This could also be true of pumps and compressors, where full flow is not needed at a given time.

There are several alternatives available to allow for controllability of motor/torque output. For example, a friction clutch can be employed to connect or disconnect the motor shaft to the output. This allows the output to be selectively turned on and off depending on the need of the process. Another alternative is to use a variable speed drive to control the torque input provided by the electric motor. This is typically in the form of a variable frequency drive (VFD). The VFD effectively changes the frequency of the AC power delivered to the electric motor. The motor speed is directly linked to the frequency of the AC power. VFD's are relatively complex to install and operate, particularly in a harsh environment. The VFD power electronics are sensitive to the heat and moisture making them difficult and expensive to protect in outdoor and harsh operating environments. In many cases, VFD's are not employed due to these complexities and limitations.

Friction clutches have been used for a long time to connect and disconnect rotating processes from their respective rotating input power sources. Friction clutches are a good choice when the process can benefit from being disconnected for substantial periods of time. When a process needs to be connected frequently or when a reduced (but non-zero) output speed would be beneficial, friction clutches are often not a preferred choice. This is due to the substantial wear on the friction material and mating surfaces that results in reliability concerns and relatively high maintenance costs.

Viscous friction clutches have been successfully deployed in automotive applications to drive cooling fans and pumps. Viscous clutches are desirable because they are able to control an output over a wide speed range. They are also desirable due to the use of a shearing fluid as the torque transfer means. The shearing fluid has a long service and life and is generally maintenance-free. However, stationary (i.e., non-rotating) mounting brackets used with many viscous clutches can undesirably add mass, occupy large amounts of space, and limit mounting locations for the associated clutch.

It is therefore desired to provide a viscous clutch with an alternative configuration that provides a modular control coil assembly and/or provides both input and output on a rear side of the clutch.

SUMMARY

In one aspect, a viscous clutch according to the present invention can include an input member, an output member, a working chamber defined between the input member and the output member, a reservoir to hold a supply of a shear fluid fluidically connected to the working chamber by a fluid circuit, a valve that is electromagnetically actuatable to selectively control a flow of the shear fluid between the reservoir and the working chamber along the fluid circuit such that a torque coupling between the input member and the output member can be created as a function of a volume of the shear fluid present in the working chamber, and a securing mechanism. The control coil assembly includes a modular center hub removably attached to the input member, an electromagnetic coil, and a coil bearing rotatably supporting the electromagnetic coil on the modular center hub. The securing mechanism is removably attached to the input member radially inward of the working chamber and the reservoir, and includes a radially outwardly extending flange.

In another aspect, a method of using a viscous clutch according to the present invention includes engaging a housing hub of an input member to an input shaft from a prime mover, securing the housing hub to the input shaft in a rotationally fixed manner with a securing mechanism, engaging a belt to a pulley on an output member, attaching a control coil assembly to the input member at an opposite side of the clutch from the belt and the input shaft, introducing a shear fluid to a working chamber, and transmitting torque between the input member and the output member through the shear fluid present in the working chamber. The securing mechanism can be a bushing.

In yet another aspect, a viscous clutch according to the present invention includes a housing having a housing hub, a rotor disk, a stub shaft rotationally fixed to the rotor disk, a bearing set positioned between the stub shaft and the housing hub, a working chamber defined between the housing and the rotor disk, a reservoir to hold a supply of a shear fluid and fluidically connected to the working chamber by a fluid circuit, a valve that is electromagnetically actuatable to selectively control a flow of the shear fluid between the reservoir and the working chamber along the fluid circuit such that a torque coupling between the housing and the rotor disk can be created as a function of a volume of the shear fluid present in the working chamber, and a control coil assembly removably attached to the housing. The control coil assembly includes an electromagnetic coil, and a securing mechanism attached to the housing hub. The securing mechanism can be a bushing. The stub shaft can be concentric with the housing hub and axially overlap the housing hub. The reservoir can be carried by the housing and rotate at all times with the housing The present summary is provided only by way of example, and not limitation. Other aspects of the present invention will be appreciated in view of the entirety of the present disclosure, including the entire text, claims and accompanying figures.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

In general, a clutch according to the present invention is a viscous clutch that allows for a torque input and output to be located on the same side of the clutch, and to have a reservoir located on an input to the clutch. Additionally, or in the alternative, the clutch provides a modular construction with a removable control coil assembly that can be located on an opposite side of the clutch from the torque input and output. Such a clutch is suitable to meet the needs of motor driven process applications, for example. In one embodiment, the input to the clutch is a shaft input, which can be a centrally located shaft of the clutch (also called a "live center" shaft), a shaft of a prime mover (e.g., the torque output or driveshaft of an electric motor), or a separate shaft rotationally fixed to such a shaft. The output of the clutch selectively and controllably drives an output or process, which can be, for example, a gear, sprocket, or, preferably, a pulley for a belt drive. Torque transmission between the input and the output is selectively controlled by regulating a quantity of a shear fluid (e.g., silicone oil or other suitable viscous fluid) in a working chamber positioned between the input and the output of the clutch. Regulation of the shear fluid flow between the working chamber and the reservoir can be achieved using a suitable valve assembly, which can be actuated by an electromagnetic coil of the control coil assembly. Numerous other features and benefits of the present invention will be recognized by those of ordinary skill in the art in view of the entirety of the present disclosure, including the accompanying figures.

Figure 1:
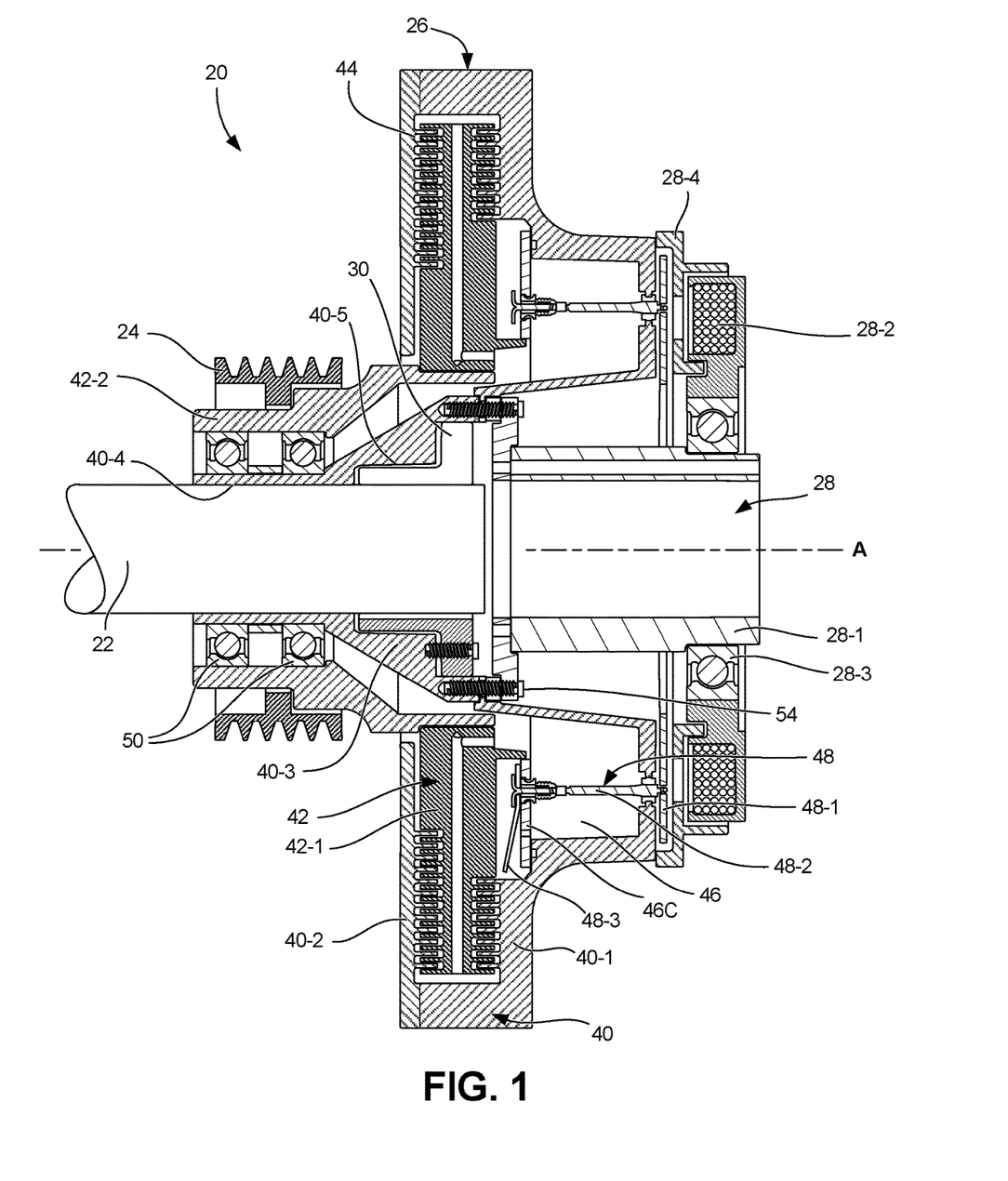
FIG. 1 is a cross-sectional view of an embodiment of a clutch system according to the present invention.
Figure 2:
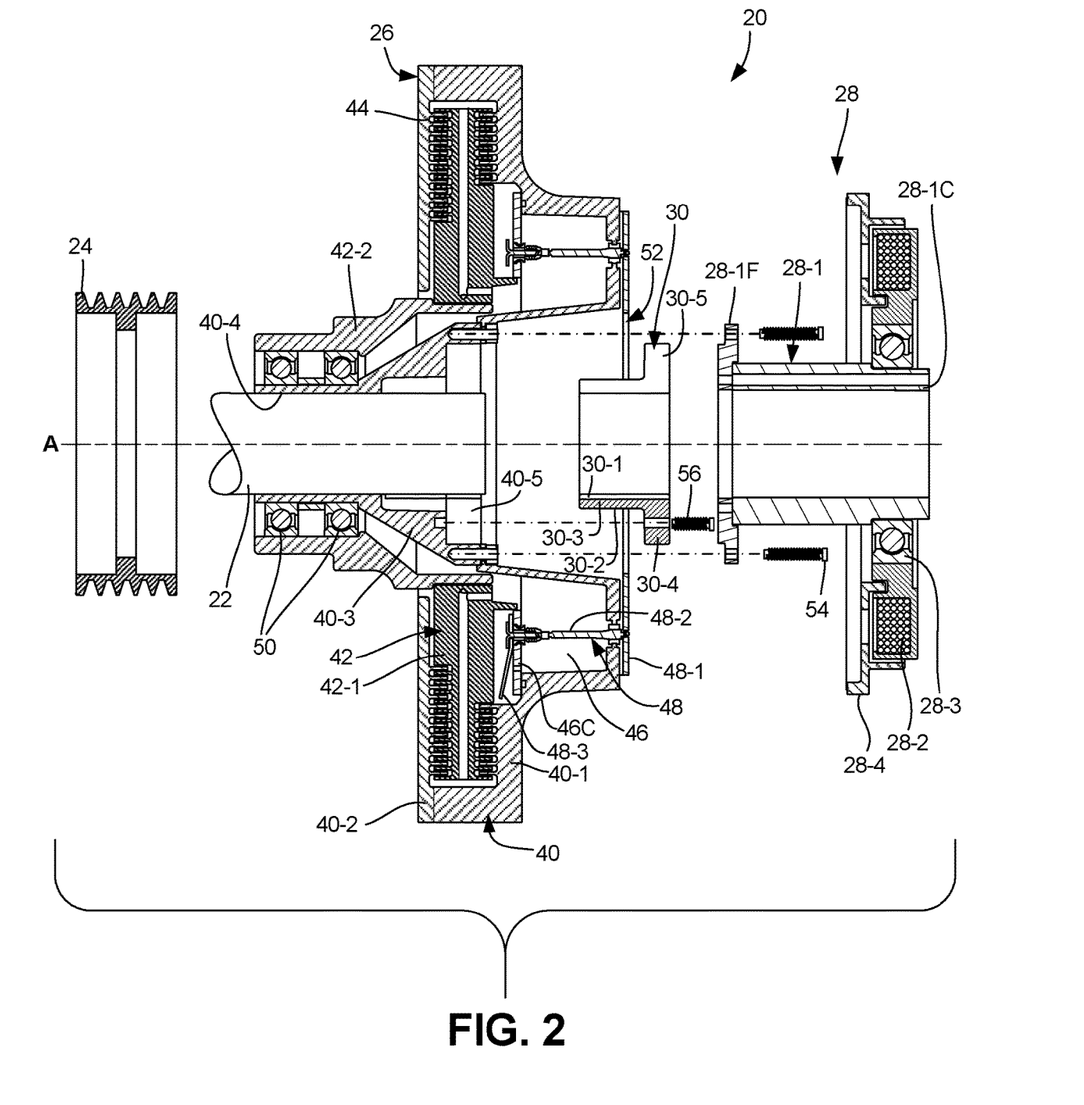
FIG. 2 is an exploded cross-sectional view of the clutch system of FIG. 1.

FIG. 1 is a cross-sectional view of an embodiment of a clutch system 20, and FIG. 2 is an exploded cross-sectional view of the clutch system 20. The clutch system 20 may also be referred to simply as clutch 20. In the illustrated embodiment, the clutch system 20 includes an input device 22, an output device 24, a clutch mechanism 26, a control coil assembly 28, and a securing mechanism 30.

The input device 22 in the illustrated embodiment is a driveshaft (or output shaft) of a prime mover (see FIG. 3), such as an electric motor. The input device 22 provides a torque input to the clutch mechanism 26. As explained further below, the input device 22 in the illustrated embodiment is removably connected to an input member of the clutch mechanism 26 in a rotationally fixed manner using the securing mechanism 30. The input device 22 establishes an axis A of the clutch system 20. As shown in the illustrated embodiment, the input device 22 extends axially from a rear side of the clutch mechanism 26. It should be noted that in further embodiments the input device 22 could be a multi-component drivetrain that links the clutch mechanism 26 to the prime mover. Alternatively, in still further embodiments the input device 22 could be integrally formed with part of the clutch mechanism 26 to provide a "live" center input shaft.

The output device 24 is illustrated as being a pulley (or sheave), but in alternate embodiments can be a gear, sprocket, or the like. The output device 24 is removably attached to an output of the clutch mechanism 26 in a rotationally fixed manner Operation of the clutch mechanism 26 allows the amount of torque transmitted from the input device 22 to the output device 24 to be selectively controlled, as discussed further below. Using a gear, sprocket or pulley as the output device 24 allows an output speed of the clutch system 20 to power a process (see FIG. 3) to be tailored by a user, such as by establishing a desired transmission ratio through selection of the number of teeth on sprockets or gears or through selection of the diameters of pulleys. Therefore, it is desirable to keep the output device 24 (e.g., sprocket, gear or pulley) as a separate and removable component from the clutch mechanism 26 in order to maintain application flexibility. Furthermore, as shown in the illustrated embodiment, the output device 24 is positioned at a rear side of the clutch mechanism 26 radially outward from the input device 22, such that the output device 24 is concentric and coaxial with the input device 22 and at least partially encircles and axially overlaps the input device 22. In this respect, the output device 24 is located on the same side of the clutch mechanism 26 as the input device 22.

The clutch mechanism 26 in the illustrated embodiment is a viscous clutch mechanism that includes an input member 40, an output member 42, a working chamber 44, a reservoir 46, a valve assembly 48, and bearings 50.

In the illustrated embodiment, the input member 40, which accepts torque input to the clutch system 20, is configured as a housing that includes a base portion 40-1, a cover 40-2, as well as a housing hub 40-3. The base portion 40-1 and the cover 40-2 are attached together to form an enclosure or shell of the clutch mechanism 26, and are located at an exterior of the clutch mechanism 26. External surfaces of the base portion 40-1 and/or the cover 40-2 can include cooling fins (not shown) to facilitate heat dissipation to ambient air. In the illustrated embodiment, the housing hub 40-3 is attached to the base portion 40-1 proximate the axis A and radially inward of the cover 40-2. The housing hub 40-3 can have a sleeve-like shape and can extend axially rearward relative to both the base portion 40-1 and the cover 40-2. An inner cylindrical engagement surface of the housing hub 40-3 can be positioned around and contact the input device 22, such that the input member 40 (and the entire clutch 20) is supported on the input device 22 (e.g., in a cantilevered or semi-cantilevered manner). In the illustrated embodiment, there is no need for any bearings to support the input member 40. A stepped notch 40-5 can be formed at or near a front side of the housing hub 40-3 along an inner surface of the housing hub 40-3. An outer surface of the housing hub 40-3 opposite the stepped notch 40-5 is frusto-conical in the illustrated embodiment, which allows a front end of the housing hub 40-3 to extend radially outward of an opposite rear end. The front end of the housing hub 40-3 can also be larger than the rear end, in order to accommodate the stepped notch 40-5. The rotationally fixed connected between the input member 40 and the input device 22 means that the input member 40 (and its sub-components) rotate at full input speed at all times, whenever there is a torque input to the clutch 20.

The output member 42 in the illustrated embodiment includes a rotor disk 42-1 and a stub shaft 42-2. The rotor disk 42-1 can be positioned within the housing enclosure formed by the base portion 40-1 and the cover 40-2 of the input member 40. The stub shaft 42-2 can be attached to the rotor disk 42-1 (or can be integrally formed with the rotor disk 42-1) and extends axially rearward from the rotor disk 42-1 in the illustrated embodiment. The stub shaft 42-2 can have a sleeve-like configuration, and can be arranged concentrically and coaxially with the housing hub 40-3 and/or the input device 22. The output device 24 can be attached directly to the stub shaft 42-2. The bearings 50, which are shown in the illustrated embodiment as a spaced apart pair of single-row ball bearings, are positioned in between the stub shaft 42-2 and the housing hub 40-3. The bearings 50 thereby allow the stub shaft 42-2 to be rotationally supported on the housing hub 40-3, with the rotor disk 42-1 cantilevered relative to the housing hub 40-3 and the input device 22 by way of the stub shaft 42-2, and allow relative rotation between the input member 40 and the output member 42. Other types of bearings (e.g., roller bearings, needle bearings, double row bearings, etc.) can be used in further embodiments. Moreover, any suitable number of bearing sets can be used, as desired for particular applications. A gap between the stub shaft 42-2 and the cover 40-2 can be blocked with a suitable seal element (not shown).

The working chamber 44 is defined between the input member 40 and the output member 42. Ribs and grooves can be provided along the input member 40 and the output member 42 to increase the surface area along the working chamber 44, in a manner well-known in the art. During operation, the presence of a shear fluid (e.g., silicone oil) in the working chamber 44 creates a fluid friction shear coupling to transmit torque from the input member 40 to the output member 42. A degree of coupling between the input member 40 and the output member 42 varies as a function of an amount (i.e., volume) of the shear fluid present in the working chamber 44. In this way, varying the amount of the shear fluid present in the working chamber 44 allows selective control of the clutch 20, to vary the torque transmission and a rotational speed of the output member 42.

The reservoir 46 can hold a supply of the shear fluid not needed in the working chamber 44. In the illustrated embodiment, the reservoir 46 is carried by the input member 40. More particularly, in the illustrated embodiment the reservoir 46 is carried by and at least partially bounded by the base portion 40-1 of the housing, with the reservoir 46 positioned to the front side of the rotor disk 42-1 axially beyond a front end of the input device 22. The reservoir 46 can have a generally annular shape, and can protrude forward from adjacent regions of the base portion 40-1. Protrusion of the reservoir 46 can create a pocket (or cavity) 52 radially inside the reservoir 46 and axially forward of the input device 22. In the illustrated embodiment, the pocket 52 has a frusto-conical shape. As discussed further below, the pocket 52 can accommodate portions of the removable control coil assembly 28 and can allow access to the input device 22 and/or the securing mechanism 30. The pocket 52 can also adjoin the stepped notch 40-5 in the housing hub 40-3. A reservoir cover 46C can be provided to define a further boundary of the reservoir 46, and to help retain the shear fluid therein. In the illustrated embodiment, the reservoir cover 46C is a plate-like wall attached to the base portion 40-1 near the rotor disk 42-1.

A fluid circuit is defined by the clutch mechanism 26, including a fluid delivery path that extends from the reservoir 46 to the working chamber 44, and a fluid return path that extends from the working chamber 44 back to the reservoir 46. In the illustrated embodiment, the fluid delivery path passes through a bore in the reservoir cover 46C and the fluid return path extends radially through the rotor disk 42-1, though other arrangements are possible in further embodiments. In alternative embodiments, the fluid return path can be defined in the input member 40, for example. A pump element along the working chamber 44 can continually pump the shear fluid back to the reservoir 46 when there is a torque input to the clutch 20, in a manner known in the art.

Because torque transmission is achieved via the frictional shearing of the shear fluid, there is heat generated in the shear fluid that needs to be dissipated to atmosphere. The full speed rotation of the input member 40 allows for efficient heat transfer, as the velocity of the air over the input member 40 is related to the ability to convectively transfer heat. The reservoir 46 being carried by and/or contained in the input member 40 has numerous benefits. First, because the input member 40 is located at an exterior of the clutch 20, the shear fluid is likewise stored near the outside of the clutch, which places the hot shear fluid in closer proximity to relatively cool ambient air, allowing the heat transfer a direct path to conduct through the input member (e.g., the base portion 40-1 of the housing) to the outside of the clutch mechanism 26. Second, even when the clutch mechanism 26 is disengaged, the shear fluid is still spinning at high speed and under pressure whenever there is a torque input to the clutch mechanism 26. Thus, when actuation of the clutch mechanism 26 is required, there is significant pressure available to force the shear fluid into the working chamber 44 quickly. This allows for a relatively fast response of the clutch 20.

The valve assembly 48 (which may also be referred to simply as valve 48) can be an electromagnetically-actuated valve assembly that regulates flow of the shear fluid between the reservoir 46 and the working chamber 44. The valve assembly 48 in the illustrated embodiment includes an axially translatable armature 48-1, a control rod 48-2, and a valve element 48-3. The valve assembly 48 can control flow of the shear fluid along the delivery path (or at another point along the fluid circuit in alternative embodiments). For instance, translation of the armature 48-1 can translate the control rod 48-2, which in turn can axially pivot or translate the valve element 48-3 to cover or uncover (i.e., obstruct or open) part of the fluid circuit. In one embodiment, actuation of the valve assembly can be similar to that described in commonly-assigned PCT Patent Application Pub. No. WO2014/047430A1, and can cover and uncover an outlet bore in the cover 46C of the reservoir 46. However, it should be noted that the particular configuration of the valve assembly disclosed herein is provided merely by way of example and not limitation. The valve assembly 48 can be actuated by selectively energizing the control coil assembly, which is described further below. Because the valve assembly 48 can be carried by the input member 40 on a front side of the clutch mechanism 26 (opposite the rear side), and can further be located entirely on the front side of the rotor disk 42-1, a relatively short magnetic flux circuit can operatively link the control coil assembly with the valve assembly 48. Such a flux circuit need not pass through any walls of the input member 40 or the output member 42, which can avoid the need for flux conducting inserts to pass through structures like the base portion 40-1 (or the rotor disk 42-1) that are typically made from non-magnetic flux conducting (or simply poorly flux conductive) materials like aluminum, which otherwise have desirable mass and thermal conductivity properties. In this respect, the flux circuit can be external to both the input member 40 (including the housing base portion 40-1 and the cover 40-2) and the output member 42 (including the rotor disk 42-1). This allows the control coil assembly to be relatively small and lightweight, due to operability of the armature 48-1 of the valve assembly 48 with relatively small magnetic fields.

The control coil assembly 28 as shown in the illustrated embodiment includes a center hub 28-1, an electromagnetic coil 28-2, a coil bearing 28-3, and a flux guide 28-4. The control coil assembly 28 is designed to removably attach to the clutch mechanism 26 opposite the output device 24 (e.g., pulley) and the input device 22 in a modular manner. As shown in the illustrated embodiment, the control coil assembly 28 is positioned at a front side of the clutch mechanism 26 and extends at least partially into the pocket 52 formed by the reservoir 46. Because the control coil assembly 28 is a separate and modular assembly, removal the control coil assembly 28 allows access to the inside of the clutch mechanism 26, including the securing mechanism 30, for attachment (or detachment) of the clutch mechanism 26 to the input device 22. Being on the front end of the entire clutch system 20 also allows easy access to provide electrical power to the coil 28-2. With the input and output devices 22 and 24 both located on an opposite side of the clutch mechanism 26 from the control coil assembly 28 also helps avoid interference between torque input and output structures (e.g., belts, the prime mover, etc.) and wiring for the control coil assembly 28.

The center hub 28-1 in the illustrated embodiment includes a cylindrical portion 28-1C and a flange 28-1F. The cylindrical portion 28-1C is hollow, in terms of having an open center along the axis A, which helps reduce the mass of the control coil assembly 28. The flange 28-1F is arranged at or near a rear end of the cylindrical portion 28-1C, and can extend radially outward. The center hub 28-1 is rotationally fixed to the input member 40, preferably by way of one or more fasteners 54 secured between the flange 28-1F and the base portion 40-1 and/or the housing hub 40-3. The cylindrical portion 28-1C and the flange 28-1F can be made as separate components attached together, or can alternatively be integrally and monolithically fabricated as a single piece. The modular center hub 28-1 can be arranged coaxially with the axis A and the input device 22. As shown in the illustrated embodiment, the center hub 28-1 is located axially forward of the input device 22 without any axial overlap, in an end-to-end arrangement, though other configurations are possible in further embodiments. Additionally, as shown in the illustrated embodiment, the center hub 28-1 does not axially overlap the housing hub 40-3.

The electromagnetic coil 28-2 is rotationally supported on the center hub 28 by the coil bearing 28-3. In the illustrated embodiment, the coil bearing 28-3 engages a front end of the cylindrical portion 28-1C of the center hub 28-1. A pilot or shoulder can be provided along an outer diameter of the cylindrical portion 28-1C to accommodate the coil bearing 28-3. In that way, the center hub 28-1 can act like a shaft that supports the electromagnetic coil 28-2 and other components of the control coil assembly in a cantilevered manner. The electromagnetic coil 28-2 can be held against rotation by a tether, bracket or other suitable structure (not shown) in a conventional manner. The flux guide 28-4 is positioned adjacent to the electromagnetic coil 28-2 to define a portion of the flux circuit. When the clutch system 20 is fully assembled, the flux guide 28-4 can be positioned adjacent to the armature 48-1 of the valve assembly 48. The flux guide 28-4 can also function as a shield, to protect components of the valve assembly 48 from debris and other undesirable environmental exposure.

The securing mechanism 30 removably attaches and engages the clutch mechanism 26 to the input device 22 in a rotationally fixed manner. In the illustrated embodiment, the securing mechanism 30 is configured as a quick detachable (QD) bushing located inward from the clutch mechanism 26, and is generally axially aligned with the rotor disk 42-1 of the output member 42, as well as being generally axially aligned with the working chamber 44. In alternate embodiments, another type of bushing or other suitable type of securing mechanism can be utilized. The securing mechanism 30 can be wholly or partially positioned within the stepped notch 40-5 in the housing hub 40-3, thereby engaging a front (or distal) end of the input device 22 to the housing hub 40-3. The securing mechanism 30 can be captured within the interior of the clutch system 20 when fully assembled on the input device 22, located axially between the housing hub 40-3 and the modular center hub 28-1, but is readily accessible by removing the modular control coil assembly 28. QD bushings have a keyed (i.e. splined) engagement feature on an inner surface and a tapered outer surface (i.e., frusto-conical outer grip surface). In this way, a keyway 30-1 on the securing mechanism 30 can engage a protruding key or spline on the input device 22 while a tapered surface 30-2 can form a tight fit against the housing hub 40-3 (e.g., within the stepped notch 40-5). The keyway 30-1 and tapered surface 30-2 are each generally located on a sleeve portion 30-3 of the securing mechanism 30, and a flange 30-4 with openings to accept suitable fasteners 56 (e.g., bolts, screws or the like) protrudes radially outward from the sleeve portion 30-3, typically at an end of the sleeve portion 30-3. The fasteners 56 allow the securing mechanism to be tightly engaged with the housing hub 40-3. The securing mechanism 30 can further have a split configuration, with a split line 30-5 passing through both the sleeve portion 30-3 and the flange 30-4. The split line 30-5 can be arranged circumferentially opposite the keyway 30-1.

Figure 3:
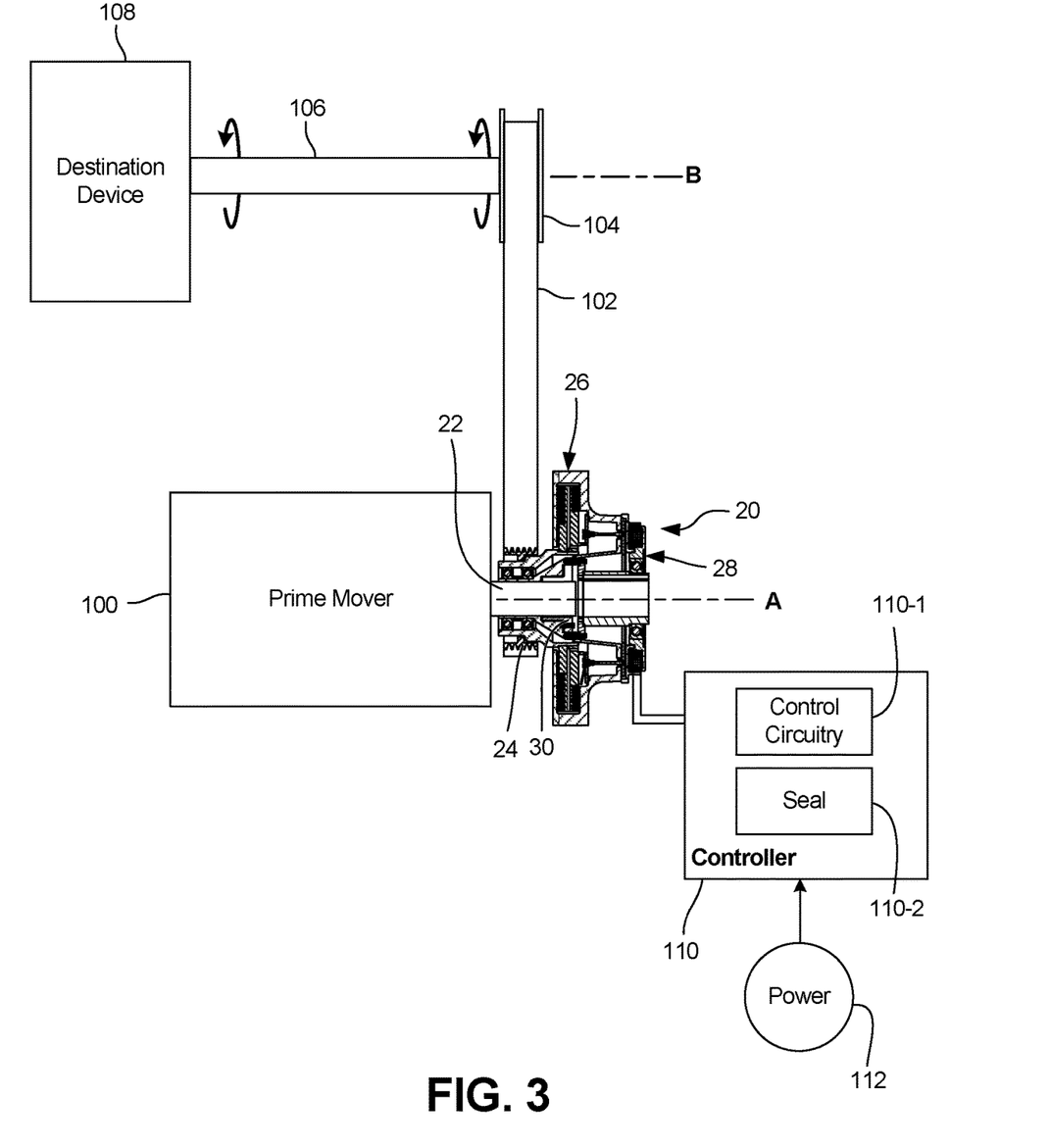
FIG. 3 is a schematic view of an embodiment of a process application utilizing the clutch system of FIGS. 1 and 2.

FIG. 3 is a schematic view of an embodiment of a process application utilizing the clutch system 20. As shown in FIG. 3, a prime mover 100 has a driveshaft used as the input device 22 (i.e., as an input shaft) that is connected to the input member housing 40 of the clutch mechanism 26. The prime mover 100 can be an electric motor, combustion engine, or other suitable source of torque.

The output device 24 is illustrated as a pulley that engages a belt 102. The belt 102 is in turn engaged with an additional pulley 104, arranged on an axis B that is parallel and spaced from the axis A. A shaft 106 is rotationally fixed to the additional pulley 104 to transmit torque to a destination device 108, such as a fan, compressor, pump, conveyor, etc. Selective actuation of the clutch system 20 allows the rotational speed of the shaft 106 and the destination device 108 to be precisely controlled relative to the input speed associated with the prime mover 100.

The control coil assembly 28 can be electrically connected to a relatively simple controller 110 that is capable of controlling the speed of the output of the clutch system 20 based on the need of the process (e.g., the needs of the destination device 108). The controller 110 can include control circuity 110-1 and suitable sealing material 110-2, which can encase the control circuitry 110-1 to protect that circuitry from environmental conditions. The controller 110 is powered by a power supply 112, though the controller 110 can have relatively minimal power demands to operate the control coil assembly 28 to actuate the valve assembly 48 (see FIGS. 1 and 2). The clutch system 20 is primarily powered by the mechanical torque supplied by the prime mover 100. In contrast, the electrical components of a variable frequency drive (VFD) need to be sized to reliably carry the entire power required by the entire system (including a prime mover) under full load. This allows for the controller 110 to be much smaller than a controller for a VFD. Because of the small amount of power, the controller 110 can also be enclosed and sealed with the sealing material 110-2, without concern for overheating, thereby reducing risks associated with exposure of the control circuitry 110-1 to the elements.

Installation and use of the clutch system 20 can include the following steps. A desired output device 24 (e.g., pulley) can be attached to the output member 42 of the clutch mechanism 26. The clutch mechanism 26 (including the output device 24) can then be slid onto the input device 22 (e.g., the output driveshaft of the prime mover 100), which can include engaging the housing hub 40-3 of the input member 40 to the input device 22. Next, the clutch mechanism 26 is secured to the input device 22. This securing step can include securing the housing hub 40-3 to the input device 22 in a rotationally fixed manner with the securing mechanism 30 (e.g., a QD bushing or other suitable bushing). The belt 102 or other transmission element is engaged to the output device 24 (e.g., pulley) on the output member 42 of the clutch mechanism 26. The belt 102, the output device 24 and the input device 22 can each be located on the same side of the clutch mechanism 26. The belt 102 can in turn be coupled to suitable additional components to allow torque transmission to the destination device 108. Next, the control coil assembly 28 can be attached to the input member 40 at an opposite side of the clutch from the belt 102, the output device 24 and the input device 22. The control coil assembly 28 can be at least partially inserted into the pocket 52 along the front of the clutch mechanism 26.

Once assembled, the clutch mechanism 26 can be operated by using the controller 110 to selectively energize the electromagnetic coil 28-2 to actuate the valve assembly 48. Actuation of the valve assembly 48 regulates the introduction of the shear fluid to the working chamber 44 from the reservoir 46. The reservoir 46 can be rotated whenever there is a torque input to the clutch mechanism 26, that is, whenever the input device 22 rotates. The presence of the shear fluid in the working chamber 44 transmits torque between the input member 40 and the output member 42, as a function of the amount or volume of the shear fluid present.

The clutch mechanism 26 can be easily removed, such as to replace the output device 24. Such a replacement of the output device 24 may be desired to change a transmission ratio, for instance (e.g., installing a differently sized pulley). The control coil assembly 28 can be removed from the input member 40. The securing mechanism 30 can then be removed as well, and the clutch mechanism 26 can be removed from the input device 22 by sliding the housing hub 40-3 off of the input device 22.

Persons of ordinary skill in the art will appreciate that the present invention provides numerous advantages and benefits. For instance, a clutch system according to the present invention is advantageous for high-torque applications. Moreover, a clutch system according to the present invention provides a convenient, modular assembly, with the torque input and output on the same side of the clutch and a coil assembly on an opposite side of the clutch, while at the same time permitting a reservoir to be located on (or carried by) the input to promote relatively quick clutch engagement during use. A relatively simply flux circuit can also be provided, and, aside from one or more flux-conducting members associated with the control coil assembly, does not require any embedded flux guide inserts to transmit magnetic flux through a wall or other material of the housing and/or rotor disk. Additionally, there is no need for a stationary mounting bracket for the clutch, which makes the overall clutch system more compact and lower in mass. Other advantages and benefits will be appreciated in view of the entirety of the present disclosure, including the accompanying figures.

DISCUSSION OF POSSIBLE EMBODIMENTS

The following are non-exclusive descriptions of possible embodiments of the present invention.

A viscous clutch can include an input member; an output member; a working chamber defined between the input member and the output member; a reservoir to hold a supply of a shear fluid, the reservoir fluidically connected to the working chamber by a fluid circuit; a valve that is electromagnetically actuatable to selectively control a flow of the shear fluid between the reservoir and the working chamber along the fluid circuit such that a torque coupling between the input member and the output member can be created as a function of a volume of the shear fluid present in the working chamber; a control coil assembly that includes a modular center hub removably attached to the input member; an electromagnetic coil; and a coil bearing rotatably supporting the electromagnetic coil on the modular center hub; and a securing mechanism removably attached to the input member radially inward of the working chamber and the reservoir; the securing mechanism can include a radially outwardly extending flange.

The viscous clutch of the preceding paragraph can optionally include, additionally and/or alternatively, any one or more of the following features, configurations and/or additional components:

the input member can include a housing, and the output member can include a rotor disk;

the input member can further include a housing hub having a central opening to allow engagement with an input shaft;

the output member can further include a stub shaft, and at least a portion of the housing hub can be positioned radially inside the stub shaft;

a bearing set positioned between the stub shaft and the housing hub;

the housing hub and the stub shaft can both extend axially away from a rear side of the rotor disk, and the modular center hub can extend axially away from a front side of the rotor disk opposite the rear side;

the securing mechanism can be axially positioned between the housing hub and the modular center hub;

the valve can include an armature, where a magnetic flux circuit connects the armature and the electromagnetic coil, and the magnetic flux circuit can be positioned externally to both the housing and the rotor disk;

the reservoir can be carried by the input member and rotates at all times with the input member;

the securing mechanism can be a quick disconnect (QD) bushing;

the modular center hub can include a cylindrical portion upon which the coil bearing is mounted; and a flange extending from the cylindrical portion, wherein the flange is connected to the input member;

the output member can include a rotor disk and a stub shaft rotationally fixed to the rotor disk, and the viscous clutch can further include a pulley rotationally fixed to the stub shaft; and/or a pulley located at a rear side of the viscous clutch, where the input member includes an input shaft engagement surface at a rear side of the viscous clutch, and where the control coil assembly is located at a front side of the viscous clutch opposite the rear side.

A method of using a viscous clutch includes engaging a housing hub of an input member to an input shaft from a prime mover; securing the housing hub to the input shaft in a rotationally fixed manner with a securing mechanism, wherein the securing mechanism comprises a bushing; engaging a belt to a pulley on an output member;

attaching a control coil assembly to the input member at an opposite side of the clutch from the belt and the input shaft; introducing a shear fluid to a working chamber; and transmitting torque between the input member and the output member through the shear fluid present in the working chamber.

The method of the preceding paragraph can optionally include, additionally and/or alternatively, any one or more of the following features, configurations and/or additional steps:

removing the control coil assembly from the input member; removing the securing mechanism; and disengaging the housing hub from the input shaft; and/or rotating a reservoir containing a supply of the shear fluid whenever the input shaft rotates.

A viscous clutch includes a housing having a housing hub; a rotor disk; a stub shaft rotationally fixed to the rotor disk, wherein the stub shaft is concentric with the housing hub and axially overlaps the housing hub; a bearing set positioned between the stub shaft and the housing hub; a working chamber defined between the housing and the rotor disk; a reservoir to hold a supply of a shear fluid, the reservoir fluidically connected to the working chamber by a fluid circuit, wherein the reservoir is carried by the housing and rotates at all times with the housing; a valve, wherein the valve is electromagnetically actuatable to selectively control a flow of the shear fluid between the reservoir and the working chamber along the fluid circuit such that a torque coupling between the housing and the rotor disk can be created as a function of a volume of the shear fluid present in the working chamber; and a control coil assembly removably attached to the housing, the control coil assembly including an electromagnetic coil; and a securing mechanism attached to the housing hub, wherein the securing mechanism comprises a bushing.

The viscous clutch of the preceding paragraph can optionally include, additionally and/or alternatively, any one or more of the following features, configurations and/or additional components:

the control coil assembly can further include a modular center hub removably attached to the housing; and a coil bearing rotatably supporting the electromagnetic coil on the modular center hub;

the securing mechanism can be a keyed and tapered quick disconnect (QD) bushing connecting the housing hub and the modular center hub; and/or the valve can include an armature, and a magnetic flux circuit connects the armature and the electromagnetic coil, and the magnetic flux circuit can be positioned externally to both the housing and the rotor disk.

SUMMATION

Any relative terms or terms of degree used herein, such as "substantially", "essentially", "generally", "approximately" and the like, should be interpreted in accordance with and subject to applicable definitions or limits expressly stated herein, if any. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Although the present invention has been described with reference to preferred embodiments, workers skilled in the art will recognize that changes may be made in form and detail without departing from the spirit and scope of the invention.

The invention claimed is:

1. A viscous clutch comprising: an input member; an output member; a working chamber defined by and between the input member and the output member;
   a reservoir to hold a supply of a shear fluid, the reservoir fluidically connected to the working chamber by a fluid circuit;
   a valve, wherein the valve is electromagnetically actuatable to selectively control a flow of the shear fluid between the reservoir and the working chamber along the fluid circuit such that a torque coupling between the input member and the output member can be created as a function of a volume of the shear fluid present in the working chamber;
   a control coil assembly that includes: a modular center hub removably attached to the input member; an electromagnetic coil; and a coil bearing rotatably supporting the electromagnetic coil on the modular center hub; and
   a securing mechanism removably attached to the input member radially inward of the working chamber and the reservoir, wherein the securing mechanism includes a radially outwardly extending flange.

2. The viscous clutch of claim 1, wherein the input member comprises a housing, and wherein the output member comprises a rotor disk.

3. The viscous clutch of claim 2, wherein the input member further comprises a housing hub having a central opening to allow engagement with an input shaft.

4. The viscous clutch of claim 3, wherein the output member further comprises a stub shaft, and wherein at least a portion of the housing hub is positioned radially inside the stub shaft.

5. The viscous clutch of claim 4 and further comprising:
   a bearing set positioned between the stub shaft and the housing hub.

6. The viscous clutch of claim 4, wherein the housing hub and the stub shaft both extend axially away from a rear side of the rotor disk, and wherein the modular center hub extends axially away from a front side of the rotor disk opposite the rear side.

7. The viscous clutch of claim 3, wherein the securing mechanism is axially positioned between the housing hub and the modular center hub.

8. The viscous clutch of claim 2, wherein the valve includes an armature, and a magnetic flux circuit connects the armature and the electromagnetic coil, wherein the magnetic flux circuit is positioned externally to both the housing and the rotor disk.

9. The viscous clutch of claim 1, wherein the reservoir is carried by the input member and rotates at all times with the input member.

10. The viscous clutch of claim 1, wherein the securing mechanism comprises a quick disconnect (QD) bushing.

11. The viscous clutch of claim 1, wherein the modular center hub includes:
a cylindrical portion upon which the coil bearing is mounted; and
a flange extending from the cylindrical portion, wherein the flange is connected to the input member.

12. The viscous clutch of claim 1, wherein the output member comprises a rotor disk and a stub shaft rotationally fixed to the rotor disk, and wherein the viscous clutch further includes a pulley rotationally fixed to the stub shaft.

13. The viscous clutch of claim 1 and further comprising:
a pulley located at a rear side of the viscous clutch, wherein the input member includes an input shaft engagement surface at a rear side of the viscous clutch, and wherein the control coil assembly is located at a front side of the viscous clutch opposite the rear side.

14. The viscous clutch of claim 1, wherein the securing mechanism comprises a keyed and tapered quick disconnect (QD) bushing.

15. A method of using a viscous clutch, the method comprising:
engaging a housing hub of an input member to an input shaft from a prime mover;
securing the housing hub to the input shaft in a rotationally fixed manner with a securing mechanism, wherein the securing mechanism comprises a bushing;
engaging a belt to a pulley on an output member;
attaching a control coil assembly to the input member at an opposite side of the clutch from the belt and the input shaft;
introducing a shear fluid to a working chamber; and
transmitting torque between the input member and the output member through the shear fluid present in the working chamber.

16. The method of claim 15 and further comprising:
removing the control coil assembly from the input member;
removing the securing mechanism; and
disengaging the housing hub from the input shaft.

17. The method of claim 15 and further comprising:
rotating a reservoir containing a supply of the shear fluid whenever the input shaft rotates.

18. A viscous clutch comprising:
a housing having a housing hub;
a rotor disk;
a stub shaft rotationally fixed to the rotor disk, wherein the stub shaft is concentric with the housing hub and axially overlaps the housing hub;
a bearing set positioned between the stub shaft and the housing hub;
a working chamber defined between the housing and the rotor disk;
a reservoir to hold a supply of a shear fluid, the reservoir fluidically connected to the working chamber by a fluid circuit, wherein the reservoir is carried by the housing and rotates at all times with the housing;
a valve including an armature, wherein the valve is electromagnetically actuatable to selectively control a flow of the shear fluid between the reservoir and the working chamber along the fluid circuit such that a torque coupling between the housing and the rotor disk can be created as a function of a volume of the shear fluid present in the working chamber; and
a control coil assembly removably attached to the housing, the control coil assembly including an electromagnetic coil, wherein a magnetic flux circuit connects the armature and the electromagnetic coil, and wherein the magnetic flux circuit is positioned externally to both the housing and the rotor disk; and
a securing mechanism attached to the housing hub, wherein the securing mechanism comprises a bushing.

19. The viscous clutch of claim 18, wherein the control coil assembly further includes:
a modular center hub removably attached to the housing; and
a coil bearing rotatably supporting the electromagnetic coil on the modular center hub.

20. The viscous clutch of claim 19, wherein the securing mechanism comprises a keyed and tapered quick disconnect (QD) bushing connecting the housing hub and the modular center hub.

* * * * *